(12) United States Patent
Bradshaw et al.

(10) Patent No.: US 6,733,022 B2
(45) Date of Patent: May 11, 2004

(54) AIR BAG FOR SPRINT CAR

(76) Inventors: Curtis S. Bradshaw, 1321 Rynex Corners Rd., Schenectady, NY (US) 12306; Curtis M. Bradshaw, 1321 Rynex Corners Rd., Schenectady, NY (US) 12306

( * ) Notice: Subject to any disclaimer, the term of this patent is extended or adjusted under 35 U.S.C. 154(b) by 0 days.

(21) Appl. No.: 10/059,385

(22) Filed: Jan. 31, 2002

(65) Prior Publication Data

US 2002/0084615 A1 Jul. 4, 2002

Related U.S. Application Data

(60) Continuation-in-part of application No. 09/803,911, filed on Mar. 13, 2001, now abandoned, which is a division of application No. 09/433,711, filed on Nov. 4, 1999, now abandoned.
(60) Provisional application No. 60/110,481, filed on Dec. 1, 1998.

(51) Int. Cl.[7] .............................................. B60G 11/26
(52) U.S. Cl. ..................... 280/124.157; 280/124.112; 267/64.11
(58) Field of Search ................... 280/124.112, 124.157, 280/124.158, 124.162, 124.179, 124.116; 267/116, 118, 120, 122, 64.11, 64.27

(56) References Cited

U.S. PATENT DOCUMENTS

| | | | |
|---|---|---|---|
| 2,317,057 A | * 4/1943 | Higby | ..................... 267/64.27 |
| 2,453,388 A | 11/1948 | Schramm | |
| 3,063,733 A | 11/1962 | Morris | |
| 3,410,573 A | 11/1968 | Hickman | |
| 3,822,908 A | 7/1974 | Gouirand | |
| 3,964,764 A | 6/1976 | Rickardsson | |
| 4,415,179 A | 11/1983 | Marinelli | |
| 4,418,932 A | 12/1983 | Claar | |
| 4,733,876 A | 3/1988 | Heider et al. | |
| 4,815,720 A | * 3/1989 | Vanessi | .................. 267/140.13 |
| 4,842,297 A | 6/1989 | Takahashi | |
| 4,858,949 A | 8/1989 | Wallace et al. | |
| 4,923,210 A | 5/1990 | Heider et al. | |
| 5,083,812 A | 1/1992 | Wallace et al. | |
| 5,201,500 A | * 4/1993 | Ecktman et al. | ............. 267/140 |
| 5,265,907 A | 11/1993 | Tostado | |
| 5,346,246 A | 9/1994 | Lander et al. | |
| 5,366,238 A | 11/1994 | Stephens | |
| 5,375,871 A | 12/1994 | Mitchell et al. | |
| 5,388,849 A | * 2/1995 | Arsenault et al. | ......... 280/425.1 |
| 5,431,429 A | 7/1995 | Lee | |
| 5,584,497 A | 12/1996 | Lander et al. | |
| 5,603,387 A | * 2/1997 | Beard et al. | ............. 180/89.12 |
| 5,639,110 A | 6/1997 | Pierce et al. | |

(List continued on next page.)

FOREIGN PATENT DOCUMENTS

| | | |
|---|---|---|
| CA | 492516 | 5/1953 |
| DE | 3934-238 A1 | 4/1991 |
| NL | 7612-924 | 5/1978 |

*Primary Examiner*—Brian L. Johnson
*Assistant Examiner*—Christopher Bottorff
(74) *Attorney, Agent, or Firm*—Richard C. Litman

(57) ABSTRACT

A vehicle air bag spring suspension system utilizing a swing arm as a member of a four-bar linkage subsystem wherein the suspension system with the airbag spring is compressed by the linkage opposite the swing arm's fulcral point relative the supported wheel. The air bag further serves as an inherently, partially dampened spring having a non-linear spring compression rate, so as to firmly keep the vehicle tires firmly planted to a rough surface. A second embodiment employs two actuator arms per wheel, wherein one inside actuator arm contacts a fixed air bag spring and cooperates with the other outside actuator arm and a rotating actuator shaft inside a frame tube to dampen wheel movement. A third embodiment employs the air spring supports directly connected to the bird cages or the housings for the bearings for both the front and rear axles.

8 Claims, 13 Drawing Sheets

U.S. PATENT DOCUMENTS

| | | |
|---|---|---|
| 5,649,719 A | 7/1997 | Wallace et al. |
| 5,711,544 A | 1/1998 | Buhl |
| 5,765,859 A | 6/1998 | Nowell et al. |
| 5,791,681 A * | 8/1998 | VanDenberg ........ 280/124.116 |
| 5,908,198 A | 6/1999 | VanDenberg |
| 5,921,532 A * | 7/1999 | Pierce et al. ............. 267/64.19 |
| 5,934,652 A * | 8/1999 | Hofacre et al. .......... 267/64.27 |
| 5,988,672 A | 11/1999 | VanDenberg |
| 6,039,337 A | 3/2000 | Urbach |
| 6,070,861 A | 6/2000 | Ecktman |
| 6,089,583 A | 7/2000 | Taipale |
| 6,092,614 A | 7/2000 | Shin |
| 6,109,598 A * | 8/2000 | Hilburger et al. ........ 267/64.24 |
| 6,168,143 B1 * | 1/2001 | Lambrecht et al. ...... 267/64.24 |
| 6,203,039 B1 | 3/2001 | Gorden |
| 6,457,702 B1 * | 10/2002 | Oishi ......................... 267/122 |

* cited by examiner

AIR BAG FOR SPRINT CAR

CROSS-REFERENCE TO RELATED APPLICATIONS

This continuation-in-part application claims the benefit of U.S. patent application Ser. No. 09/803,911 filed Mar. 13, 2001, abandoned Feb. 6, 2002; which is a division of U.S. patent application Ser. No. 09/433,711 filed Nov. 4, 1999, abandoned May 13, 2001; which application claims the benefit of U.S. Provisional Patent Application Serial No. 60/110,481, filed Dec. 1, 1998.

BACKGROUND OF THE INVENTION

1. Field of the Invention

The present invention relates to sprint vehicle suspension systems incorporating an air bag in lieu of springs, torsion bars or a coil-over design. This application further modifies the aforementioned structural systems by having (1) the front axle supporting a pair of air bags mounted proximate each front wheel, and (2) the rear axle having bird cages mounted adjacent each rear wheel over the wheel bearings and the air bags mounted on extensions.

2. Description of the Related Art

Sprint cars and other open wheeled race cars typically use a swing arm suspension. A representative prior art view is shown in FIG. 3 of this application, wherein a rear axle 180 of a sprint car 18 has a carrier hub 310 connecting the suspension to the wheel. One end of the swing arms 140 and 350 is attached to a torsion bar 320, and the other end is attached to a means of supporting a wheel, such as a carrier hub 310 on a live axle or the axle itself on a fixed axle. The torsion bar 320 is typically housed within a tubing in the frame 330 shown in shadow. The carrier hub 310 is attached to a swing arm 140 which is connected to a torsion bar 320. If only one swing arm is utilized, the swing arm 140 may lead or trail its associated axle. Supplemental suspension linkages may be present for additional support to the axle 180.

Exemplary patents of various suspension systems include the following patents and patent application publications.

U.S. Pat. No. 2,453,388 issued on Nov. 9, 1948, to Arthur G. Schramm describing a wheel suspension for trailers comprising wheels suspended on arms controlled by levers sprung to provide resiliency, and the arms being arcuately adjustable.

U.S. Pat. No. 3,063,733 issued on Nov. 13, 1962, to Bryan J. Morris describes an anti-roll vehicle suspension mechanism comprising a pair of cylindrical springs, a pair of levers pivotally connected to the chassis, axle and the springs.

U.S. Pat. No. 3,410,573 issued on Nov. 12, 1968, to Albert F. Hickman describes a vehicle spring suspension comprising an axle supporting a first arm fixed to a hub member or cross shaft. A second arm fixed to and projects radially from the hub member to bear compressively against a rubber body connected to the vehicle frame.

U.S. Pat. No. 3,822,908 issued on Jul. 9, 1974, to Rene Gouirand describing a suspension system using single or dual air bags having a tapered cross-section in the truck's longitudinal direction and supported by an upper plate and a pair of lower lever members or axle supports. The air bags are pressurized by an air pump.

U.S. Pat. No. 3,964,764 issued on Jun. 22, 1976, to Erik G. Rickardsson describes an air spring axle assembly for a spring suspension and sway resistance of a vehicle chassis comprising a U-shaped frame as a box girder spring-mounted and supporting a wheel axle.

U.S. Pat. No. 4,415,179 issued on Nov. 15, 1983, to Joseph A. Marinelli describes an axle and air bag suspension comprising a forward mounting portion and a front-to-rear trailing arm which has its forward end pivotally supported. The rear end portion of the arm is anchored to an axle by a bushed clamp sleeve. An air bag is mounted on a stationary mount portion. A Y-shaped stabilizer bar has its free ends pivoting from the forward chassis mount.

U.S. Pat. No. 4,418,932 issued on Dec. 6, 1983, to Paul W. Claar describes a front axle suspension system for a vehicle chassis comprising a first forward link and a second rearward link pivotally connected and extending down from the chassis and coupled to a third link. A spring and dampener mechanism interconnects the coupler link and chassis.

U.S. Pat. No. 4,733,876 issued on Mar. 29, 1988, to Merle J. Heider et al. describes a leaf spring supplemented with a pressure controllable air bag supplying variable spring adjustment, variable ride height, and stationary levelling of a motor home.

U.S. Pat. No. 4,842,297 issued on Jun. 27, 1989, to Mitsuo Takahashi describes a wishbone suspension system comprising upper and lower suspension arms with each arm having one end pin-connected to the vehicle body, and a knuckle member connected to a wheel axle. A connecting rod is connected at one end to an intermediate portion of one of the suspension arms, and a bell crank lever having a first end pin-connected to the other end. A second end pin is connected to one end of the knuckle member and a bent portion between these first and second ends. The bent portion is pin-connected to the other end of the suspension arms.

U.S. Pat. No. 4,858,210 issued on Aug. 22, 1989, to Donovan B. Wallace et al. describes a trailing arm suspension with a fixed cup communicating with a movable piston air spring mounted by a clamp in lateral juxtaposed relationship to a terminal end of the trailing arm assembly. A track bar with bushed joints at both ends interconnects the frame and the axle housing to provide lateral stability.

U.S. Pat. No. 4,923,210 issued on May 8, 1990, to Merle J. Heider et al. describes a leaf spring in conjunction with an air bag for motorhome levelling. A pneumatic control system communicates with the air bag to control the bag pressure.

U.S. Pat. No. 5,083,812 issued on Jan. 28, 1992, to Donovan B. Wallace et al. describes an air spring suspension system including trailing arms connecting the vehicle frame to a transverse beam connecting them with bushed articulating joints which permit the trailing arms to move with respect to each other. A stiffener arm is mounted at one end to each trailing arm by a bushed connection, and rigidly secured at the other end to the transverse beam. The system resists roll forces.

U.S. Pat. No. 5,265,907 issued on Nov. 30, 1993, to Ray Tostado describes a bolt on an auxiliary air bag suspension system, wherein the frame takes existing apertures provided in certain trucks, resulting in a removable supplemental suspension system that assists the factory suspension system.

U.S. Pat. No. 5,346,246 issued on Sep. 13, 1994, to Cecil Lander et al. describes an air bag suspension system controller for adjustment of spring rates of an air bag coupled in parallel with a leaf spring.

U.S. Pat. No. 5,366,238 issued on Nov. 22, 1994, to Donald L. Stephens describes a trailing arm suspension system having a tapered arm at a pivoting end so as to reduce arm weight in conjunction with an air spring at the opposite end.

U.S. Pat. No. 5,375,871 issued on Dec. 27, 1994, to James L. Mitchell et al. describes a vehicle suspension system comprising a wide base beam and an axle shell. The beam is mounted for pivoting movement to a hanger and securely to a vehicle axle. The beam is constructed with a laterally widening base as it extends longitudinally from the pivot mounting to the axle, and with an axle shell securing the beam to the axle to reduce stress on the axle.

U.S. Pat. No. 5,431,429 issued on Jul. 11, 1995, to Unkoo Lee describes a vehicle suspension system including a knuckle pivotally supporting a wheel with upper and lower control arms connecting upper and lower parts of the knuckle to the vehicle.

U.S. Pat. No. 5,584,497 issued on Dec. 17, 1996, to Cecil Lander et al. describes an air bag suspension controller system for automatic adjustment of spring rates of an air bag mechanically coupled in parallel with a leaf spring.

U.S. Pat. No. 5,639,110 issued on Jun. 17, 1997, to William C. Pierce et al. describes a trailing arm suspension for heavy duty vehicles comprising a fabricated beam of three pieces connected at two joints. A shock absorber bracket is integrally formed with the basic beam. A casting fixed in a preformed seat in the basic beam facilitates an axle connection.

U.S. Pat. No. 5,649,719 issued on Jul. 22, 1997, to Gareth A. Wallace et al. describes a weight-reducing, z-spring alternative in the form of an arm linkage and suspension system for heavy weight bearing vehicles featuring upper arms y-mounted to the frame sides and the axle center.

U.S. Pat. No. 5,711,544 issued on Jan. 27, 1998, to Reinhard Buhl describes an axle suspension for rigid vehicle axles comprising two longitudinal control arms connecting the vehicle body to the axle. A triangle pull rod is articulated to the axle and body centrally, and laterally offset. A stabilizer bar including a torsion spring bar counteracts lateral tilting by torsional stresses. The stabilizer bar is arranged directly between the longitudinal control arms, and its ends connected as a universal joint, but rotating in unison.

U.S. Pat. No. 5,765,859 issued on Jun. 16, 1998, to Corbett W. Nowell et al. describes a modular squatdown wheeled suspension system comprising air bags supported between pivoted bracket elements located adjacent the trailer wheels. An air supply system with an automatic locking arrangement allows the trailer deck to be lowered to a ground engaging position and raised back to the transport position.

U.S. Pat. No. 5,908,198, issued on Jun. 1, 1999, to Ervin K. VanDenberg describes a center beam and air spring suspension system comprising a central beam having a mounting flange on each side and pivotally mounted to a suspension frame at one end and rigidly attached to an axle at the other end. A control arm is pivotally mounted to each mounting flange at one end, and to the suspension frame at the other end. The pivot connection of the central beam may have a constant or varying air spring rate.

U.S. Pat. No. 5,988,672 issued on Nov. 23, 1999, to Ervin K. VanDenberg describes an air spring suspension system with an integral box beam comprising the box beam welded around the axle and having a pair of axially aligned and spaced apart pivots which include air springs having horizontal, vertical and axial spring rates.

U.S. Pat. No. 6,039,337 issued on Mar. 21, 2000, to Brian A. Urbach describes a vehicle suspension with a stroke-reducing linkage comprising a spring/damper assembly interposed between the control arm and the vehicle frame.

U.S. Pat. No. 6,070,861 issued on Jun. 6, 2000, to Jack D. Ecktman describes a bumper extension for use with a bumper on an air spring.

U.S. Pat. No. 6,089,583 issued on Jul. 18, 2000, to Erkki Taipale describes a vehicle stabilizer incorporating a torsion bar.

U.S. Pat. No. 6,092,614 issued on Jul. 25, 2000, to Tae-Hak Shin describes a structure for installing a conventional shock absorber for the rear suspension in a solar driven automobile.

U.S. Pat. No. 6,203,039 B1 issued on Mar. 20, 2001, to Marvin J. Gordon describes an independent suspension system for a four-wheeled trailer with an improved vertical alignment and range of travel which includes air bags at each end of the axle beams.

Canadian Patent Application No. 492,516 published on May 5, 1953, for Ernest E. Smith et al. describes a suspension system with an inelastic yet flexible inflatable conduit providing an air cushion.

Netherlands Patent Application No. 7612-924 published on May 23, 1978, for Dr. S. Rosenthal describes a swing arm suspension system having an air spring with the wheel situated at a fulcral point. The air spring may have an auxiliary spring of the diabolo type inside.

German Patent Application No. 3934-238-A1 published on Apr. 18, 1991, for Audi AG (Heinz Hollerweger et al.) describes a vehicle wheel suspension with an elastically mounted wheel guide and having a first variable volume chamber acted on by lateral wheel forces to create an under-steer effect on the wheel. The first chamber is pressurized by a second variable volume chamber operated by lateral wheel forces. The two chambers can be incorporated into one unit with no separate components required.

None of the above inventions and patents, taken either singularly or in combination, is seen to describe the instant invention as claimed. Thus, an air bag for sprint cars solving the aforementioned problems is desired.

SUMMARY OF THE INVENTION

The present invention relates to the field of vehicle suspension systems, specifically in the first two embodiments as an air bag spring-dampener on (1) a swing arm suspension with the spring-axle connected via a four-bar linkage and (2) two actuator arms and a rotating actuator shaft, wherein the air bag spring replaces traditional torsion bars or coil springs. These systems are particularly suitable for use on racing cars on dirt or rough surfaces, and more specifically, on an open wheeled sprint, midget, micro-sprint, mini-sprint, championship dirt car, micro-midget, super-modified, championship dirt car, and well-suited for heavier cars such as modified race cars. In competition, such race cars endure severe forces often resulting in loss of wheel to road surface contact, and resulting loss of traction, control and speed. A further refinement by a simplified third embodiment is presented having (1) the front axle supporting a pair of air bags mounted proximate each front wheel, and (2) the rear axle having bird cages mounted adjacent each rear wheel over the wheel bearings and the air bags mounted on extensions. An upper adjustable mount for the air bag having a clamp is welded onto the frame of a sprint car.

Accordingly, it is a principal object of the invention to provide an improved lightweight suspension system for a racing vehicle on a dirt track.

It is another object of the invention to provide an improved lightweight suspension system which is based on air springs mounted directly on the front axle.

It is a further object of the invention to provide an improved lightweight suspension system which is based on air springs mounted on extensions proximate the rear axle inside bird cages.

Still another object of the invention is to provide an improved lightweight suspension system having an upper adjustable mount for the air spring with a clamp affixed to the frame.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The first embodiment 8 of the present system incorporates a four-bar linkage system connecting an axle swing arm suspension system to an air bag spring dampening system.

Figure 3:
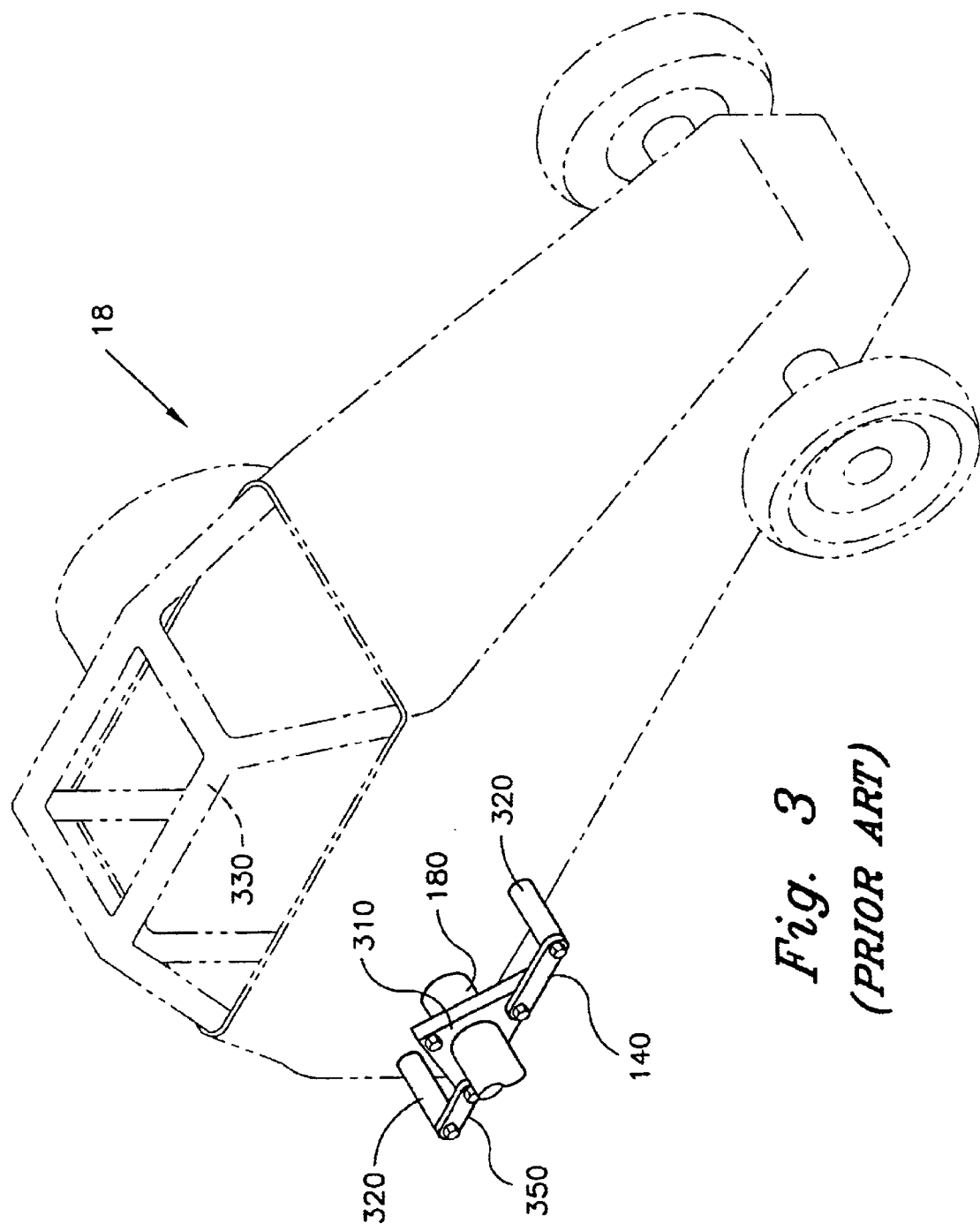
FIG. 3 is a perspective view of a swing arm suspension utilizing torsion bar springs in a prior art sprint car shown in shadow.
Figure 5:
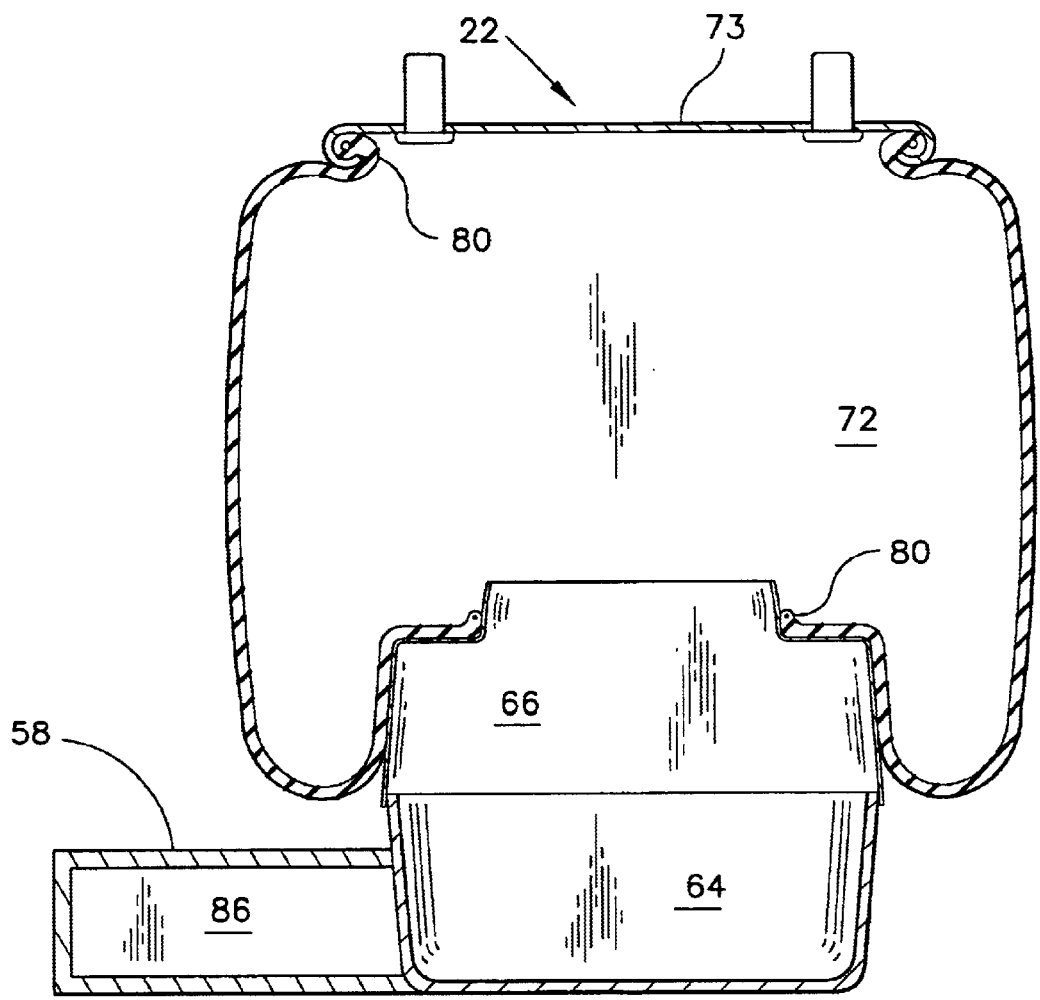
FIG. 5 is a sectional side view of a prior art air bag spring as described by FIG. 8 in U.S. Pat. No. 4,858,949 to Wallace et al.
Figure 6:
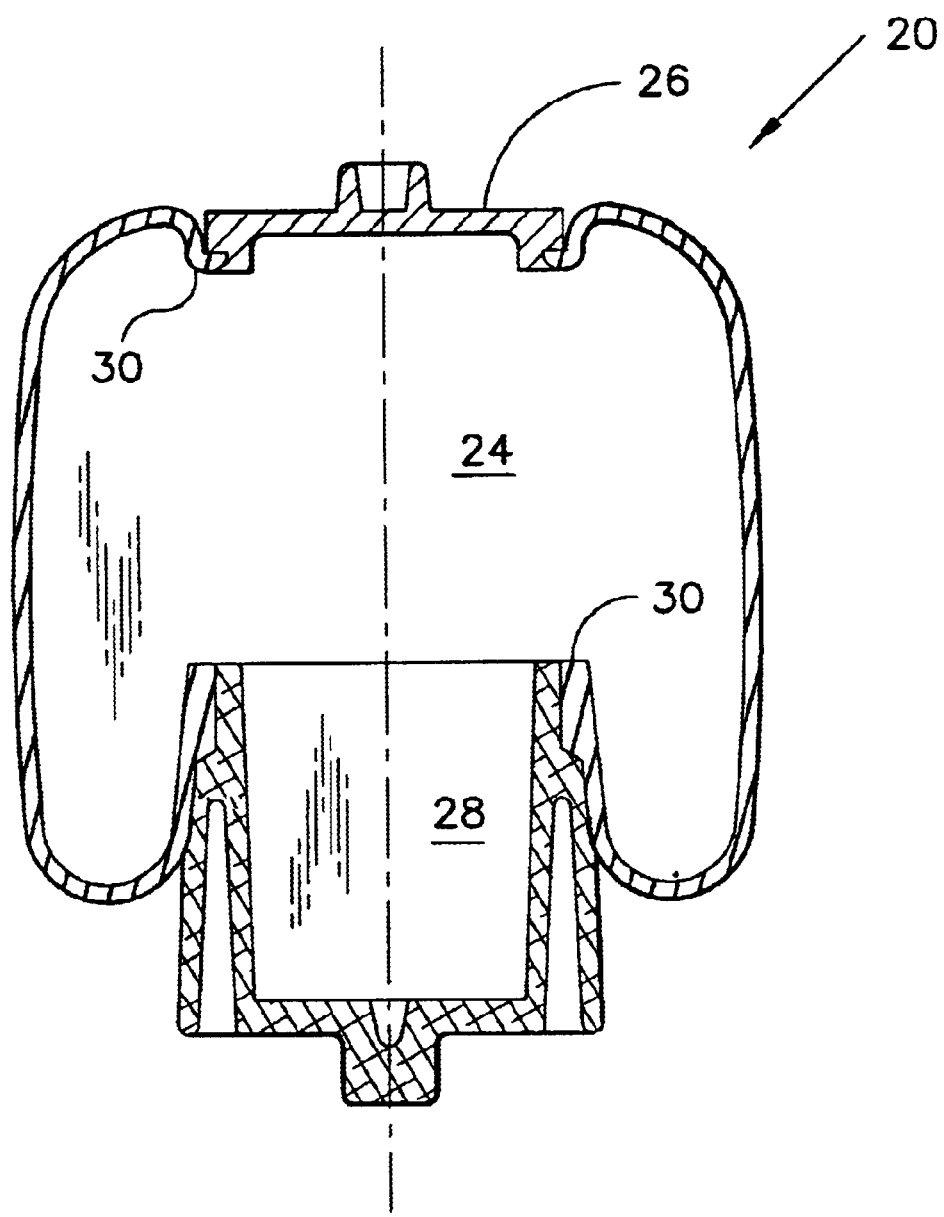
FIG. 6 is a sectional side view of a prior art GOODYEAR™ air spring 1S6-023.

FIGS. 3, 5 and 6 depict prior art suspension systems with air bag springs. In FIG. 3, a sprint car 18 having a frame 330 supported in the rear by a rear axle 180 having a triangular carrier hub 310 at each end. A pair of torsion bars 320 are attached to one carrier hub 310 by a front swing arm 140 and a rear swing arm 350. FIG. 5 illustrates an air bag spring assembly 22 comprising an air spring 72 having a top cover 73 and self-sealing beads 80 mounted on a movable piston 66 over a cup 64 which is attached to a top mounting plate 58 on a terminal end of a trailing arm 56. FIG. 6 shows the aforementioned GOODYEAR™ air bag spring 1S6-023 as 24 in an air spring assembly 20 having a top cover 26 and a cup 28 secured by self-sealing tire beads 30.

Figure 1:
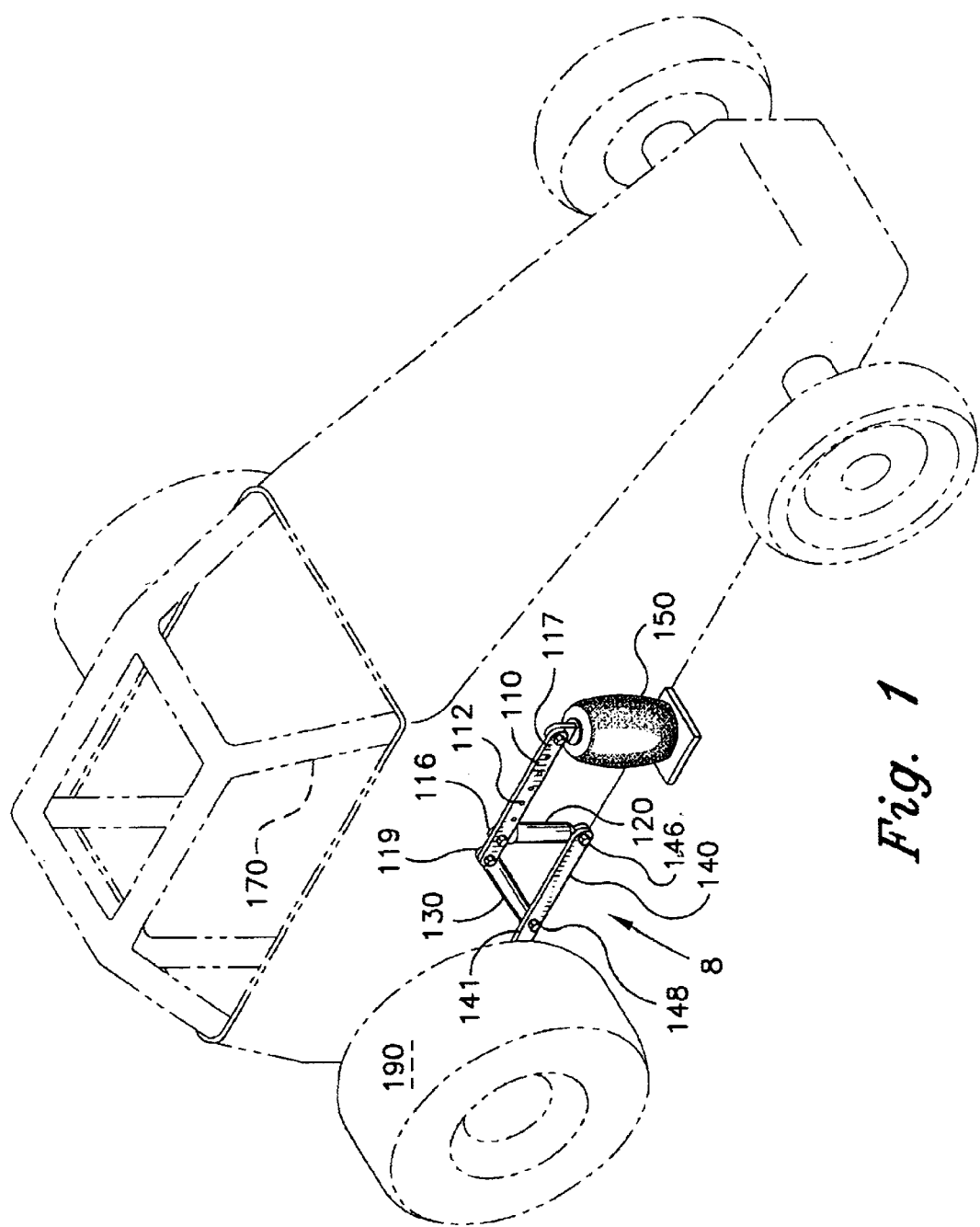
FIG. 1 is an environmental, perspective view of a first embodiment of an air bag suspension installed for a rear axle of a sprint race car shown in shadow according to the present invention.
Figure 2:
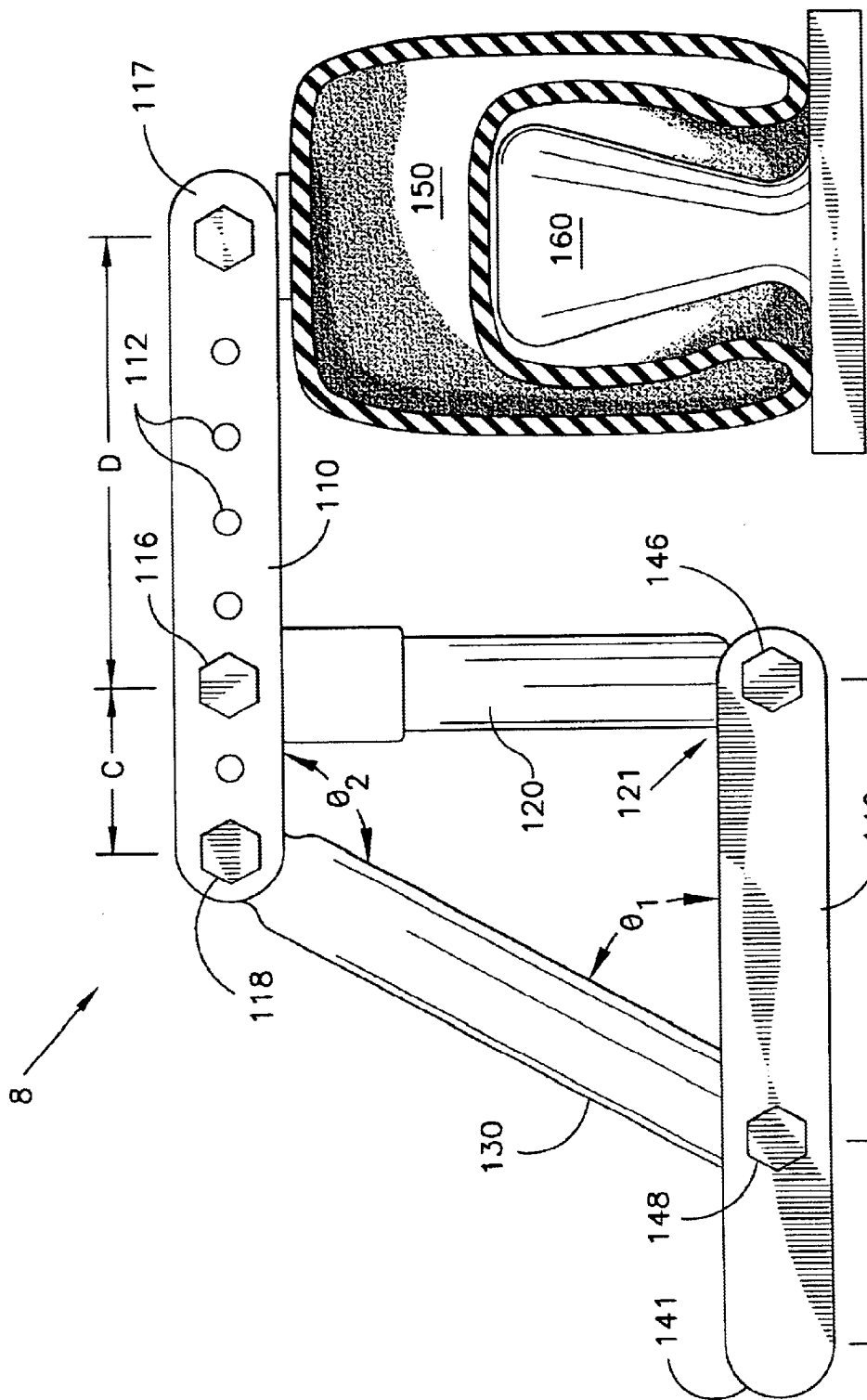
FIG. 2 is a partially sectioned side elevational view of an air bag draped over its shaping cone and in contact with a four-bar linkage.
Figure 4:
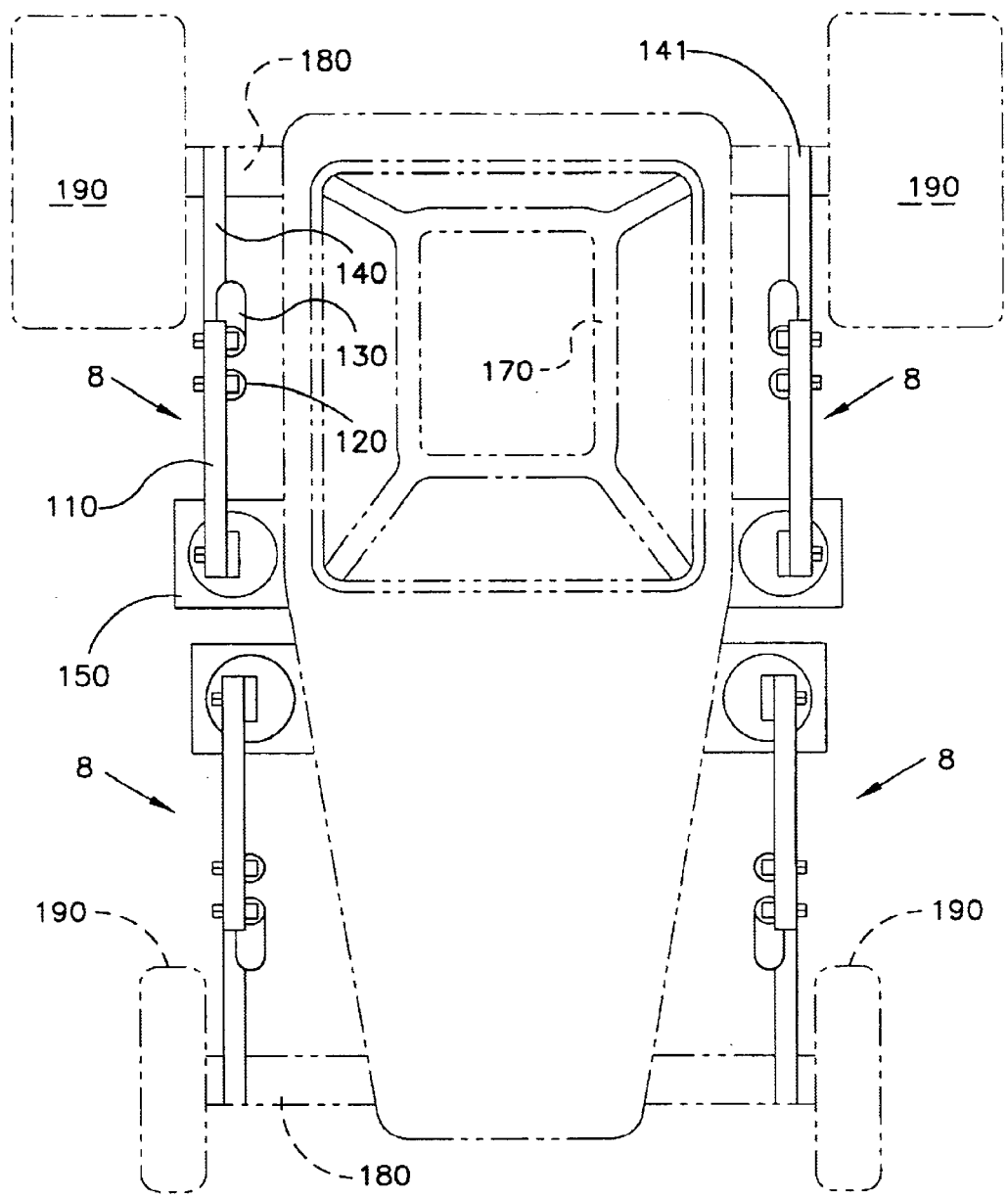
FIG. 4 is a top plan view of a sprint car shown in shadow equipped with four air bag springs and bar linkages.

Turning to the first embodiment 8 of FIGS. 1, 2 and 4, an air bag spring 150 is draped over an inverted cone 160 (FIG. 2) Such air bag springs 150 are available through GOODYEAR™ or FIRESTONE™ with GOODYEAR™ bag number 1S6-023 serving as an optimal choice. A wide variety of air bags are available with varying size and stiffness. The cone 160 provides support toward shaping and holding up the air bag. The draped air bag provides a spring resistance to an input link of a four-bar linkage, having four pivot joints interconnecting the four bars. The appearance of first, second, third and fourth structural members may be described out of numerical sequence for the sake of brevity and the sake of understanding of functional relationships.

The input link 110 has a first pivot joint 116 and has an end 117 in contact with the air bag spring 150, the contact generally being located at the top of the air bag spring 150. The input link 110 is in rotational contact about the first pivot joint 116 with the air bag spring 150, whereby substantially antagonistic oppositional forces from the air bag 150 are applied against the input link 110.

The input link 110 is attached, at the end 119 distant to the air bag, to a second pivot joint 118. Connected to the second pivot joint 118 is a second coupler link 130 functioning as a push rod. Between the air bag spring 150 and the second pivot joint 118 is the first pivot joint 116. The first pivot joint 116 serves as a second fulcral point. Pivotally attached at the first pivot joint 116 is a first coupler link 120 functioning as a pull rod. At the end 121 (FIG. 2) of the first coupler link 120, distant from the input link 110, is a third pivot joint 146 attached to the frame or chassis 170 of the vehicle. Also pivotally attached on the frame or chassis 170 at the third pivot joint 146 is a swing arm 140. The distant end 141 of the swing arm 140 is attached to a carrier hub 310 (FIG. 3) on the vehicle axle for live axles or half shafts, or directly to the axles for wheels not attached to rotating axles. This attachment to the carrier hub 310 or axle 180 will generally be a pivotal link (not shown). Orienting the swing arm 140 longitudinally parallel to the chassis and perpendicularly to the respective axle simplifies chassis construction and facilitates suspension adjustment and maintenance, though swing arms may be oriented in numerous other directions. The front swing arm 140 has a fourth pivot joint 148 located between the third pivot joint 146 and the axle 180. Pivotally attached at the fourth pivot joint 148 is the push rod coupler link 130.

Figure 7:
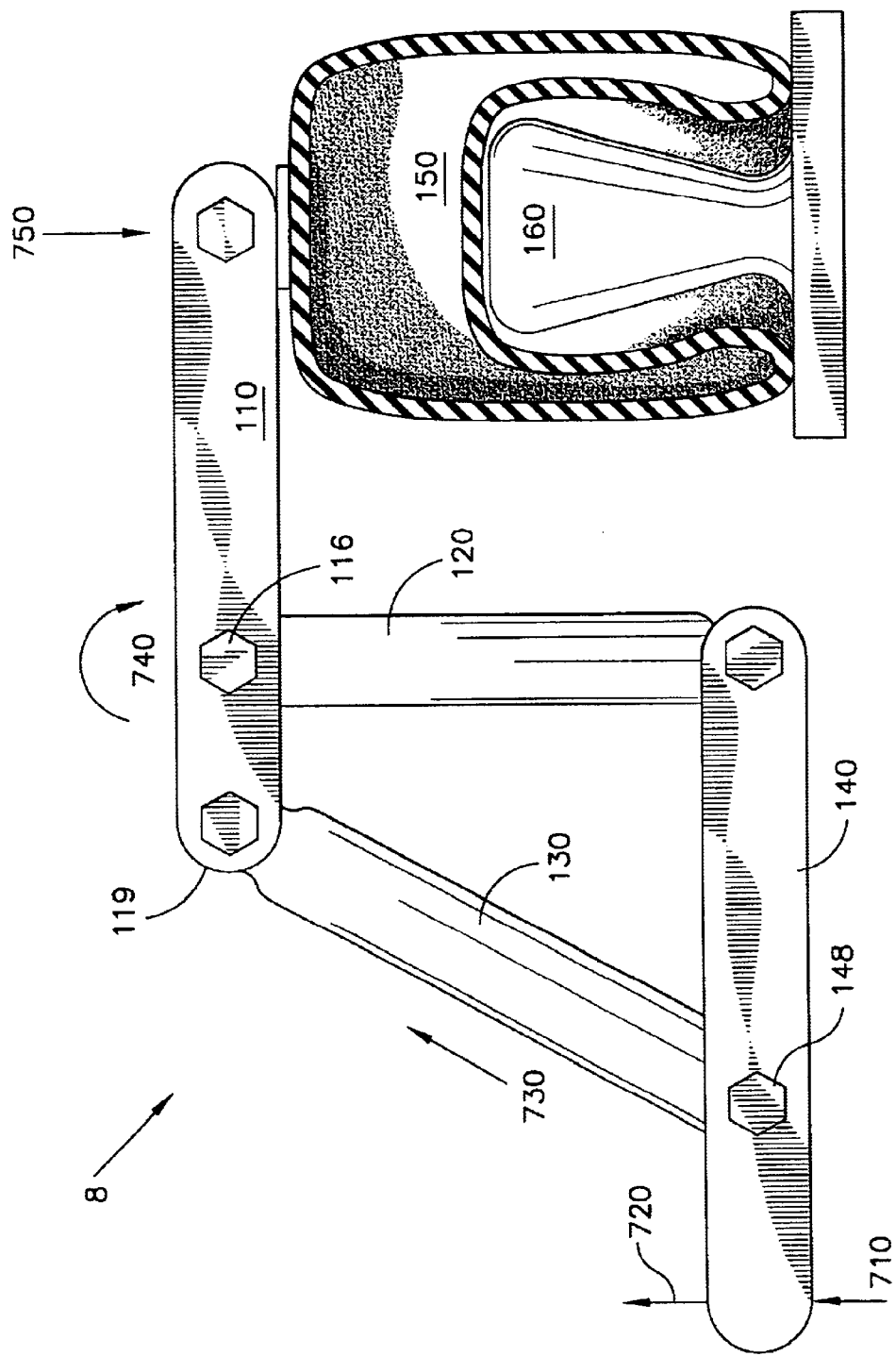
FIG. 7 is a partially sectioned side view showing the direction of motion and the forces of an air bag spring being compressed by upward forces acting upon a wheel.

Referring to FIG. 7 which shows relative force vectors to describe the invention's action and reaction, a rise in the wheel relative to the chassis typically occurs due to an upward force 710 at the ground, resulting from factors such as (1) a rise in the surface such as a bump or hill, (2) a downward force on the chassis as the bottom of a hill, trough or hole, (3) the chassis rolling in the direction of the wheel in turning a corner, and (4) acceleration (rear wheels) or deceleration (front wheels). The forced rise in the wheel in turn forces (at 720) the swing arm 140 up at the axle connection, which in turn pushes (at 730) the second coupler link or push rod 130 up. The push rod 130 then pushes the attached end 119 of the input link 110 up, which forcibly pivots (at 740) the input link 110 about the first fulcral point (first pivot joint 116) resulting in the end of the input link 110 pressing down (at 750) in contact with the air bag spring 150. The force 750 acts downwardly, allowing the arm of the input link 110 to continue to pivot until the opposing force vector associated with pressure in the air bag spring 150 is equalized. In other words, the rotational force from the input link 110 is antagonistically counteracted such that the forces come into balance and into fulcral equilibrium.

Figure 8:
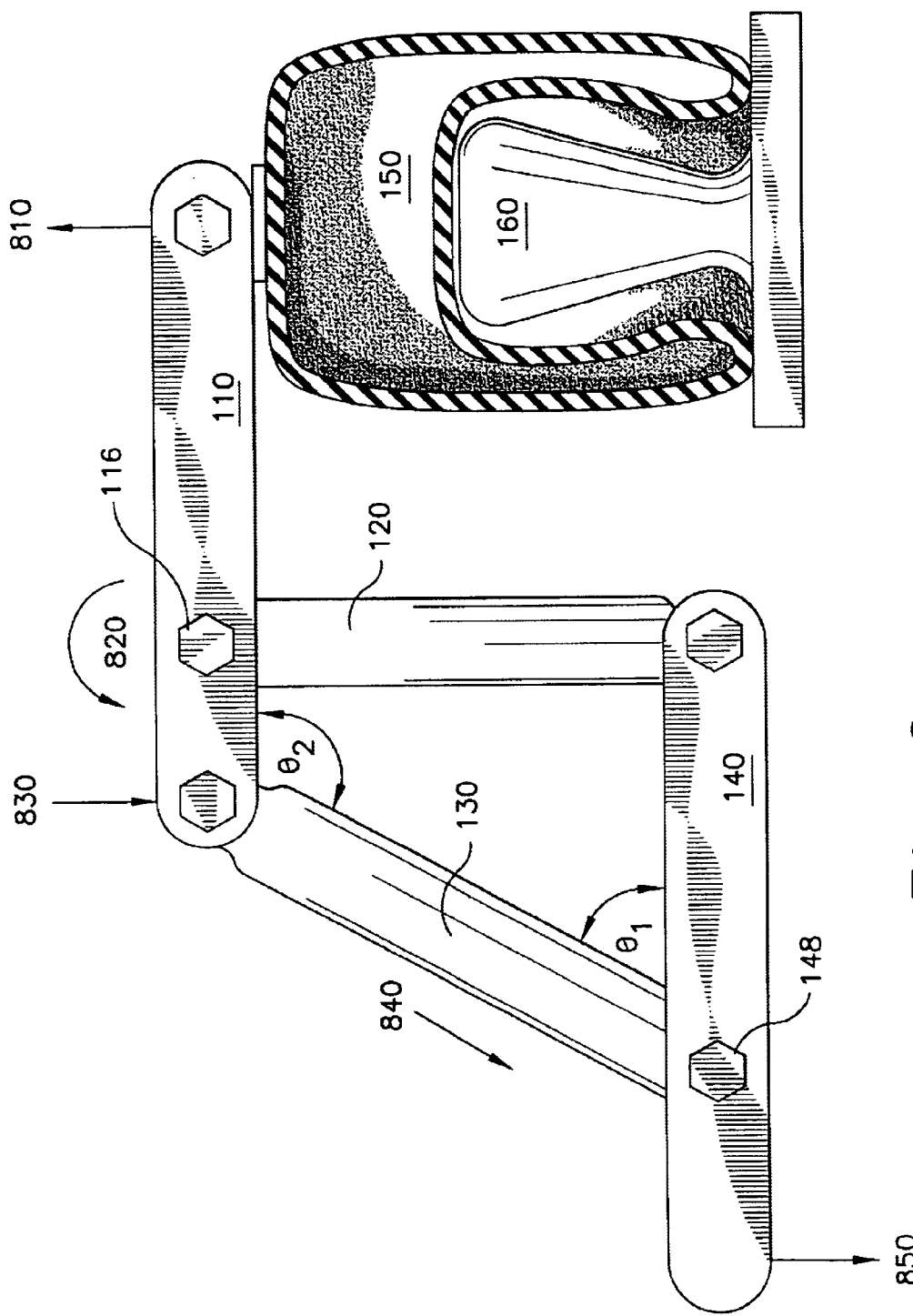
FIG. 8 is a side view showing the direction of motion and the forces acting upon a wheel being pushed down by an air bag spring.
Figure 9:
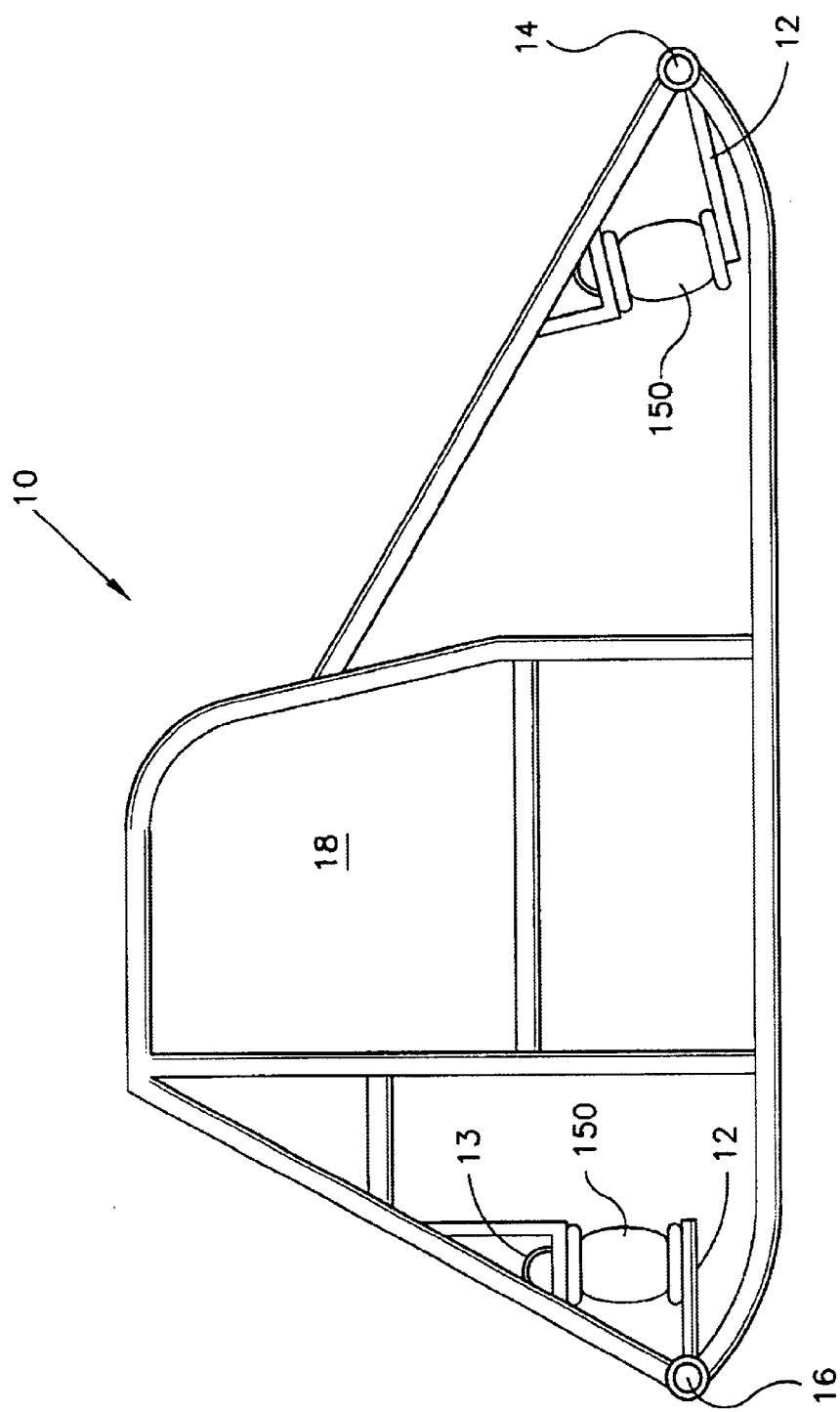
FIG. 9 is a right side elevational view of a sprint car with a second embodiment of the innovative air springs installed in the front and rear.

Alternately, as suggested by FIG. 8, weight may be transferred from the wheel 190 (FIG. 1) as the road drops away from it, such as by entering a hole, cresting a bump or hill, or the car rolling away from the wheel 190 during cornering, deceleration (rear wheels), or acceleration (front wheels). Such events all may result in a reduction in upward force at the wheel. This reduction in weight on the wheel permits the air bag to force (at 810) the arm of the input link 110 up, forcibly rotating (at 820 on the first coupler link 120) the input link 110 about the first fulcral point or the first pivot joint 116, thereby transferring force along vector 830 down on the end of the input link 110, opposite the force vector 810 of the expanding air bag spring 150. This in turn results in a vector force 840 longitudinally directed down the push rod or second coupler link 130, thereby forcing (at 840) the front swing arm 140 down. This force 840 in turn exerts a transferred downward force 850 onto the axle 180 (not shown), until such point as the force 810 exerted by the air bag spring 150 and the upward wheel force 710 (FIG. 7) are fulcrally balanced in equilibrium.

Additionally, the four-bar linkage achieves a positional offset for the point of contact with the air bag spring 150. This permits the input link 110 of the four-bar linkage to come in contact with the air bag spring 150 at a point well clear of the ground.

As depicted in FIGS. 1 and 2, the four-bar linkage provides a means for adjusting spring coefficients independent of air pressure and air bag changes. The four-bar linkage can be used to increase or decrease the effective spring coefficient as seen at the axle by adjusting the travel of the input link adjoining the air bag. The effective spring coefficient is adjusted by the following equation with the angles and distances depicted in FIG. 2.

$$F_{effective}=(F_{actual})\times((A+B)/B)\times[\cos(\text{theta }1)]\times([C/D)\cos(\text{theta }2)]$$

where:
A=the distance between the wheel center and the fourth pivot joint 148;
B=the distance between third pivot joint 146 and the fourth pivot joint 148;
C=the distance between the first pivot joint 116 and the second pivot joint 118;
D=the distance between the first pivot joint 116 and the air bag spring 150;
Theta 1=the angle formed by the swing arm 140 and the second coupler link 130 closest the air bag spring 150 about the inside of the fourth pivot joint 148; and
Theta 2=the inside angle formed by the second coupler link 130 and the input link 110 closest the air bag spring 150 about the inside of the second pivot joint 118.

The linkage adjustments increase or reduce the force maintained on the axle with respect to axle travel. The linkage adjustment may be readily facilitated by drilling a plurality of holes 112 (FIGS. 1 and 2) in the input link 110 and repositioning the first pivot joint 116, or fulcral point which in turn adjusts variables C, D and Theta 2.

As a portion of the spring character of the airbag is obtained through air-compression and expansion, the airbag provides a non-linear resistance to the arm travel, thus creating an inherently damped spring due to energy losses associated with compression and expansion of gases.

Due to the relatively low viscosity of air, an airbag has a higher and broader frequency response than traditional dampening devices such as shock absorbers using high viscosity fluids. This results in a smaller portion of the high speed vibrations that are likely to be found on bumpy surfaces such as dirt courses to transfer via the suspension to the chassis as the suspension will flex with these high speed movements as contrasted with the slower suspension systems. Likewise, high frequency Fourier components of individual pulses and movements may be readily transferred to the air bag spring 150, thereby resulting in lesser values for the derivatives of the displaced wheel distance with respect to time, such as acceleration and over the course of the travel of the swing arm 140.

Figure 12:
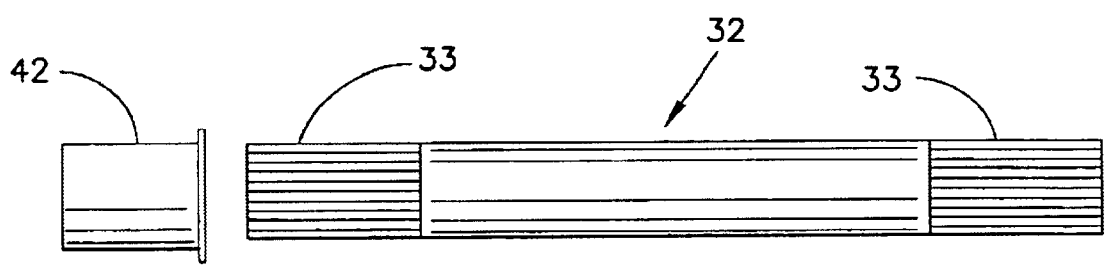
FIG. 12 is an elevational side view of an actuator shaft in the second embodiment.

The second embodiment 10 illustrated in FIGS. 9–12 employs a first inside actuator arm 12 acting on an air bag spring 150 pressurized by an air hose 13 for each wheel 190 on the front axle 14 and the rear axle 16 of a sprint car 18. The first inside actuator shaft 12 has a distal end connected directly to a hollow rotating actuator shaft 32 housed inside a horizontal frame tube 34 consisting of three separate frame supported sections. A second outside actuator arm 36 has a first end 38 connected to the housing of the axle 14 or 16 and a second end 40 connected to an outside end of the rotating actuator shaft 32. The inside actuator arm 12 is provided with a splined hole which is slotted at the end of the arm for clamping with a bolt (not shown) onto one of the splined ends 33 of the rotating hollow shaft actuator shaft 32 and further protected by a bushing 42 as shown in FIG. 12. The inside actuator arm 12 can have a series of holes for saving weight (not shown).

Figure 10:
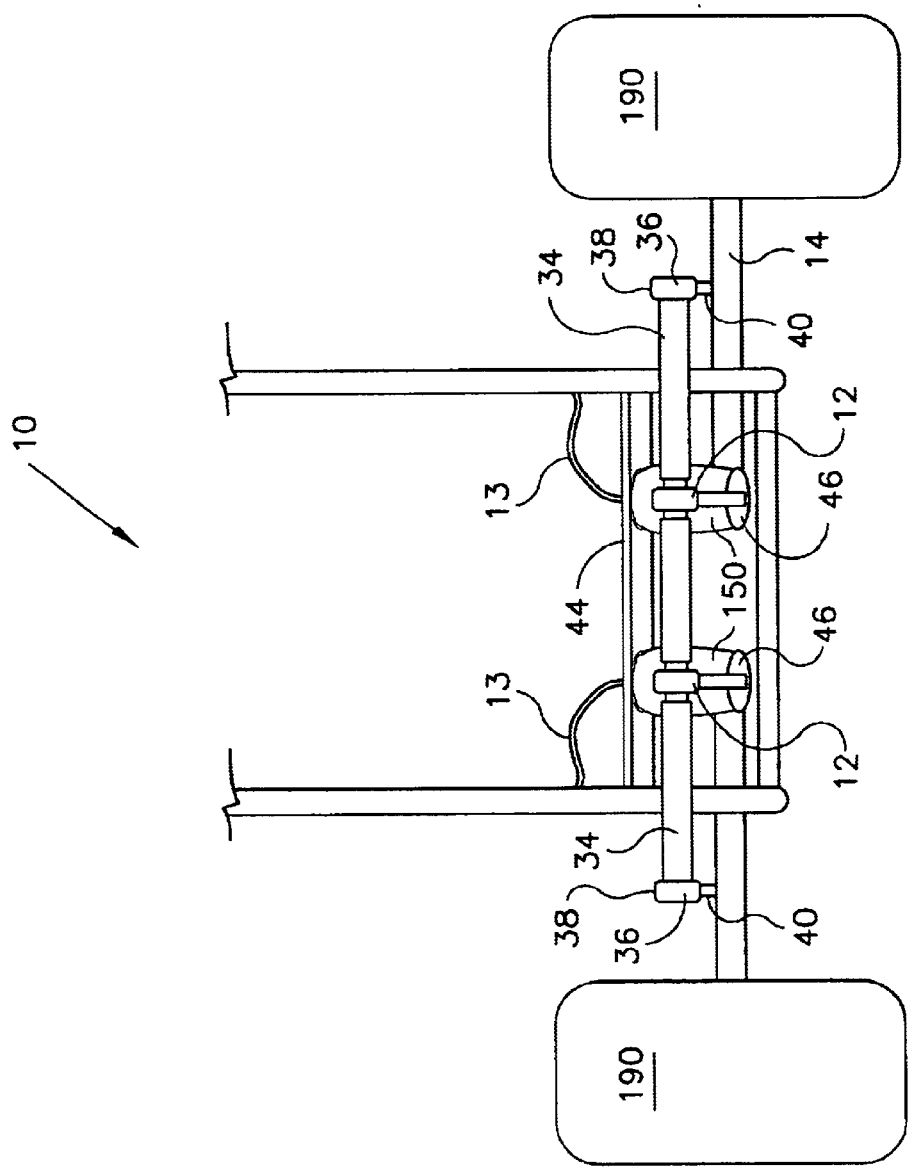
FIG. 10 is a front elevational view of the second embodiment of the innovative air springs for the front axle in a sprint car.
Figure 11:
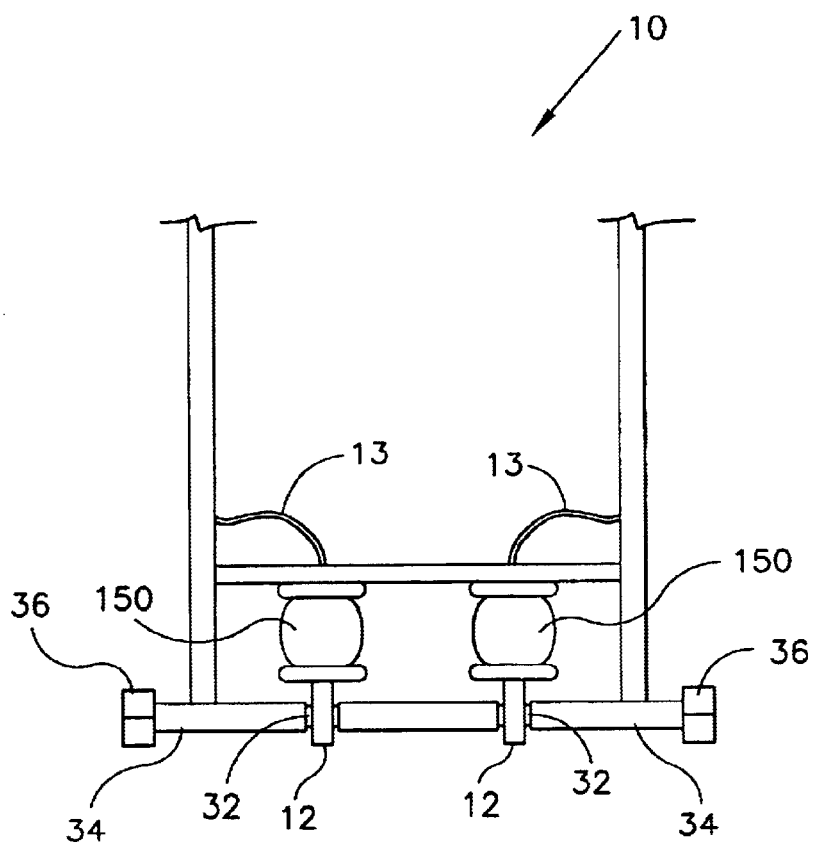
FIG. 11 is a rear elevational view of the second embodiment of the innovative air springs for the rear axle in a sprint car.

As shown in FIG. 10, an additional frame element 44 can be provided for supporting the air bag spring 150 on top and a circular support plate 46 on the bottom which is attached to the first inside actuator arm 12. Thus, the second embodiment system 10 again provides a lightweight but durable suspension system for a sprint car.

Figure 13:
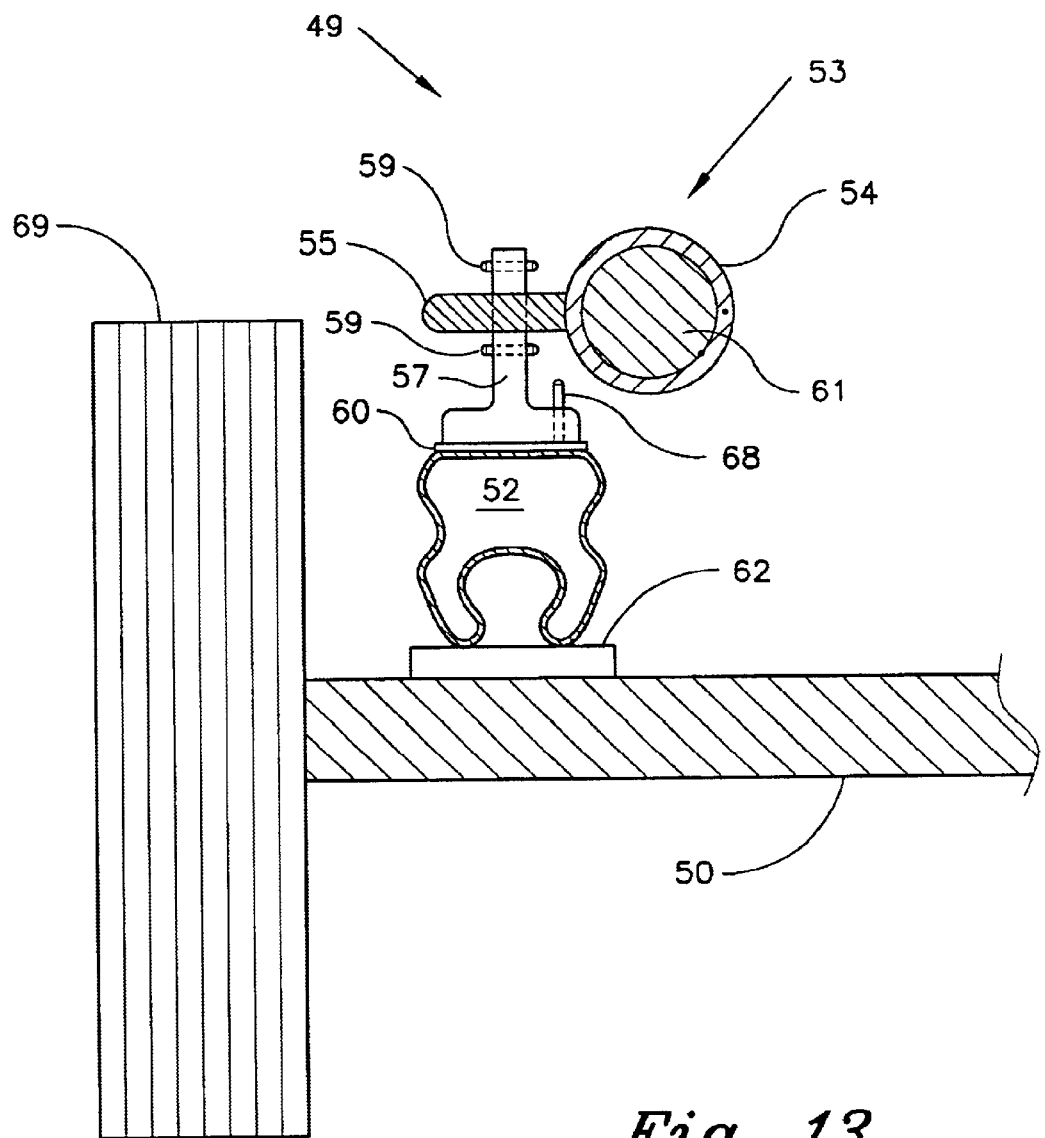
FIG. 13 is a schematic front elevational view of a third embodiment for a front axle, wherein the pair of air spring supports are directly connected by a lower mounting plate to the front axle housing and the bird cages with the adjustable upper mount movable in a clamp welded to the vehicle frame.
Figure 14:
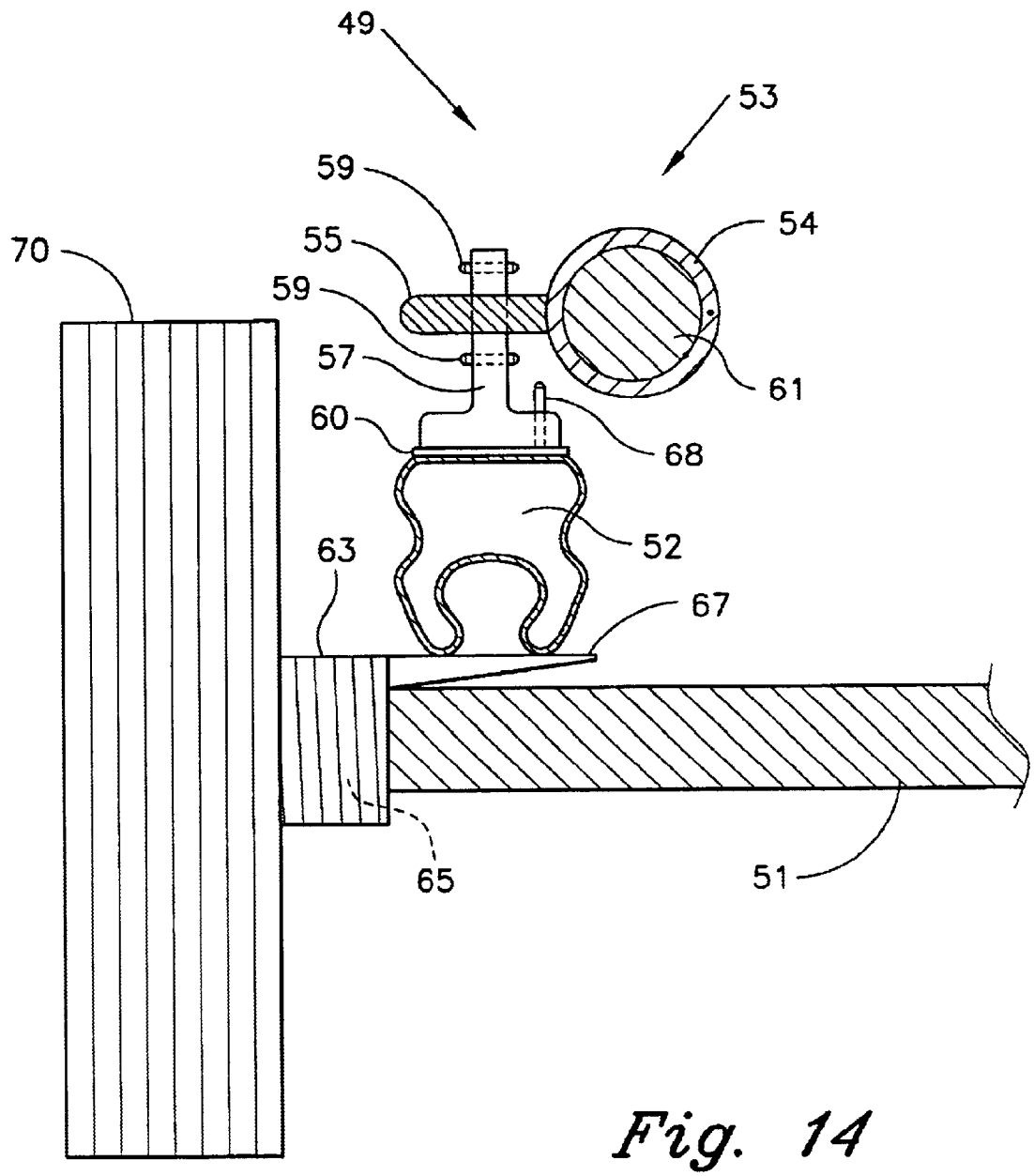
FIG. 14 is a schematic front view of the third embodiment for a rear axle, wherein the air springs are directly connected to the bird cages or housings for the wheel bearings.

In a third embodiment 49 illustrated in FIG. 13 (front axle 50) and FIG. 14 (rear axle 51), another support means is provided for the air bags 52 having air intake stems 68. In FIG. 13 a clamp 53 having a ring 54 with an apertured extension 55 supports the upright post 57 having peripheral stops 59 of the circular upper mount 60 of the air bag 52. The clamp 53 can be either welded or fastened tightly by fasteners (not shown) onto the frame 61, and is utilized for supporting the air bags 52 for both the front axle 50 and rear axle 51.

On the front axle 50, the air bags 52 for the front wheels 69 are directly connected to circular metal plates 62 welded onto the axle 50. For the rear axle 51 the bird cages or housings 63 hold the bearings 65 (hidden). The wheel bearings 65 are sealed roller bearings. A wedge shaped metal lower mount 67 extending from and welded to the bird cage 63 supports the air bag 52 for each rear wheel 70. The wheel bearings 65 and bird cages 63 are attached to the rear axle 57 by sliding over the ends of the axle.

It should be noted that there is both a reduction in weight associated with the use of air bag springs over metal coils or torsion springs and a reduction in unsprung weight, both of which will improve the handling of the vehicle.

It is to be understood that the present invention is not limited to the embodiments described above, but encompasses any and all embodiments within the scope of the following claims.

We claim:

1. An air bag suspension system for a vehicle frame having front and rear axles comprising:

a vehicle frame having front and rear axles and wheels;

an air bag spring having a contiguous upper mount means and a contiguous lower mount means positioned on the front and rear axles adjacent the wheels, wherein each said lower mount means on the rear axles is wedge shaped;

each air bag spring's contiguous upper mount means having a vertical post;

a clamp for each air bag spring affixed on the frame having an apertured ring extending therefrom; and the post of each bag spring positioned within each apertured ring;

whereby the air bag springs replace other vehicle suspension systems.

2. The air bag suspension system according to claim 1, further comprising a cone positioned within each air bag spring, wherein the cone is based on the lower mount.

3. The air bag suspension according to claim 1, wherein said air bag suspension system is on a sprint car frame.

4. The air bag suspension system according to claim 1, wherein the air spring bag has an air intake stem for inflation.

5. The air bag suspension system according to claim 1, wherein each lower mount means for the front axle is circular and welded onto the front axle.

6. The air bag suspension system according to claim 1, wherein said each lower mount wedge means is welded to a bird cage.

7. The air bag suspension system according to claim 6, wherein each bird cage holds wheel bearings.

8. The air bag suspension system according to claim 7, wherein the wheel bearings and the bird cages are positioned on the rear axle by sliding over the ends of the axle.

* * * * *